April 23, 1946.   D. C. ECKENBECK ET AL   2,399,107
LOCKNUT
Filed Oct. 2, 1944   2 Sheets-Sheet 1
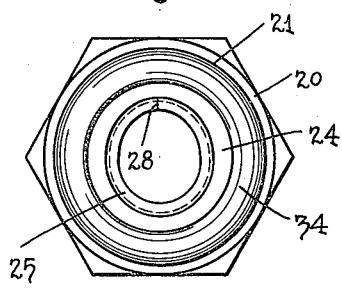
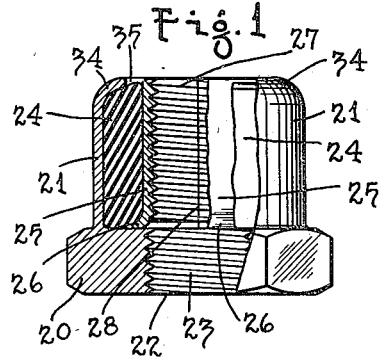
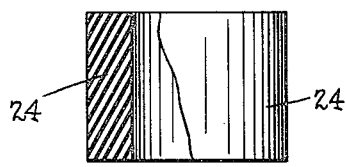
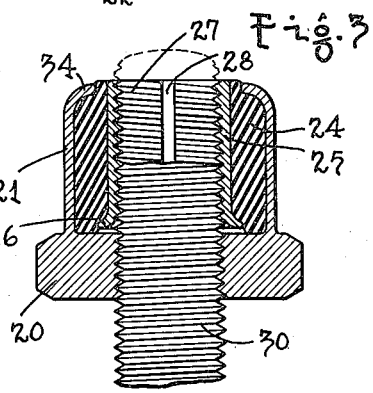
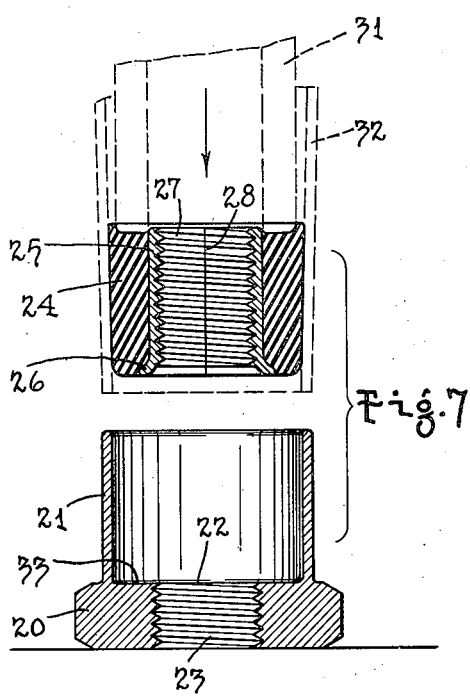
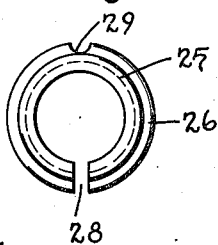
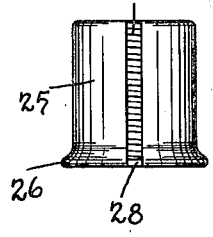
Inventors
Dana C. Eckenbeck
Charles L. Madden and
Philip E. Slaughter
By Caswell & Lagaard
Attorneys

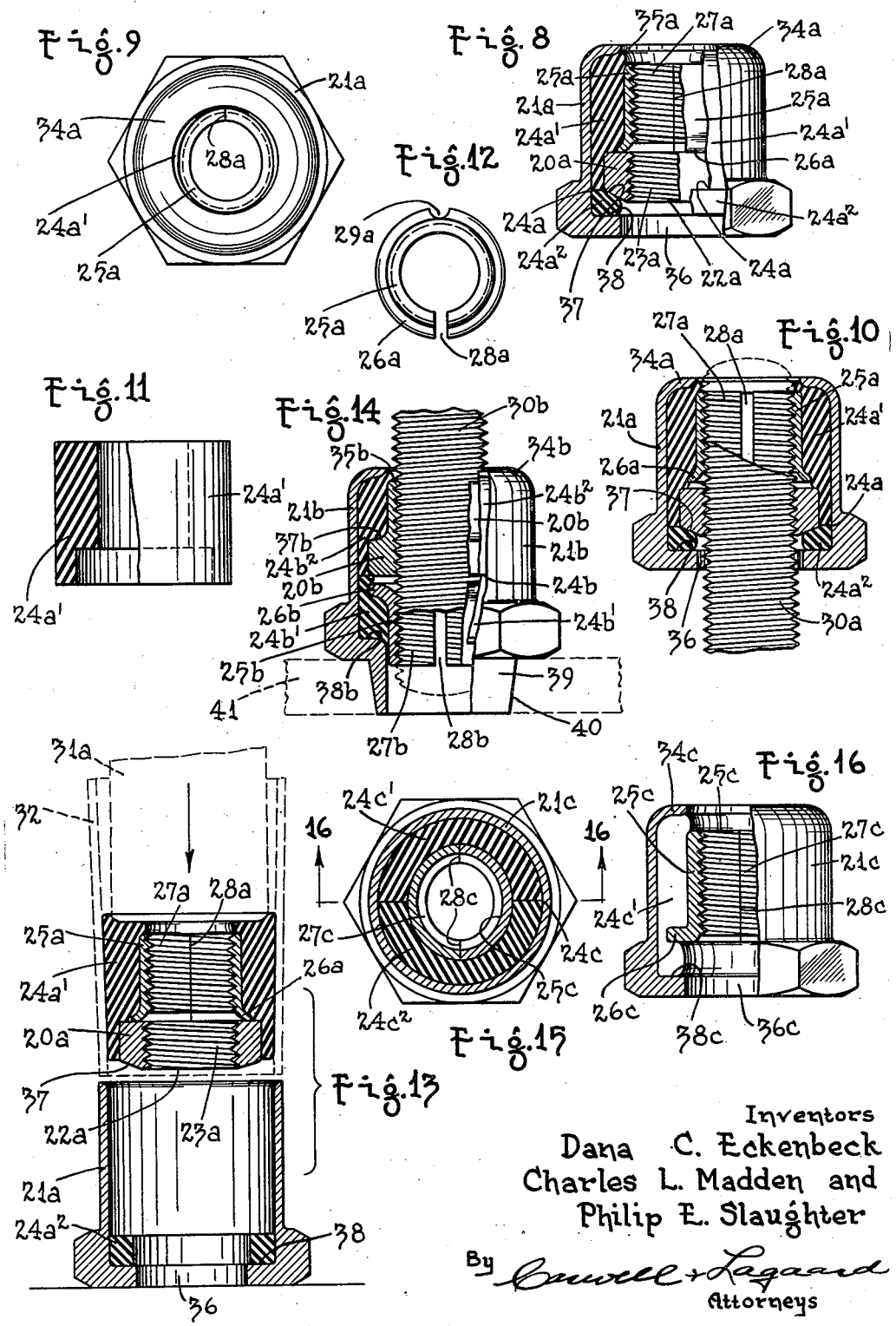

Patented Apr. 23, 1946

2,399,107

UNITED STATES PATENT OFFICE 2,399,107

LOCK NUT

Dana C. Eckenbeck, Charles L. Madden, and Philip E. Slaughter, Minneapolis, Minn.

Application October 2, 1944, Serial No. 556,684

17 Claims. (Cl. 151—30)

Our invention relates to improvements in locknuts, an object thereof being to provide a novel self-locking nut for conventional bolts that is simple, durable and relatively inexpensive in construction and one that is capable of effectively withstanding loosening under trying conditions as in structures attended with severe vibration such, for example, as the modern high-powdered craft and vehicles used in the air and on water and land, another object of the invention being to provide an efficient method for making such lock-nuts.

A further object of the invention is to provide an improved lock-nut so constructed that it may be applied and repeatedly re-applied without injury either to nut or bolt and without appreciable diminution of the self-locking power of the nut.

A feature of the invention resides in providing a relatively large area of locking contact between nut and bolt with an attending self-application of relatively great force throughout such area directed toward restricting any nut-loosening rotation between nut and bolt.

Another feature of the invention resides in the employment of rubber or a similar resilient flowable material as an element in a composite nut structure, wherein such element is flowably distorted by compression and thus energized to supply the force for locking the nut to a bolt.

An additional feature of the invention resides in the provision of a nut, as above, in which the resilient element acts upon the bolt through a bolt-contacting member of relatively firm material, a further feature of the invention residing in the employment in a lock-nut of a bolt-contacting member, as above, adapted to exert a combination of locking forces including a gripping force about the bolt and axial forces setting up binding actions between thread faces on the nut and bolt.

Another object of the invention is to provide a simple and highly efficient lock-nut having features of construction readily adapting it for use for resilient as well as for non-resilient retention.

Other objects of the invention reside in the novel combination and arrangement of parts and in the details of construction hereinafter illustrated and/or described.

In the drawings, Fig. 1 is a view partly in elevation and partly in section illustrating a form of lock-nut constructed in accordance with our invention; Fig. 2 is a plan view of the lock-nut shown in Fig. 1; Fig. 3 is a view similar to Fig. 1, but entirely in section and accompanied with a bolt fragmentarily shown as threaded into the lock-nut; Fig. 4 is a detail view, partly in section and partly in elevation, illustrating the resilient annulus employed in the lock-nut construction shown in Figs. 1, 2 and 3; Fig. 5 is an elevational view and Fig. 6 is a plan view showing in detail the locking-sleeve employed in the lock-nut construction illustrated in Figs. 1, 2 and 3; Fig. 7 is a sectional view showing the blank constituting the jacket and the body of the lock-nut employed in the construction illustrated in Figs. 1, 2 and 3, and showing further the assembled resilient annulus and locking sleeve, and still further diagraming a method for applying the assembled annulus and sleeve to said blank; Fig. 8 is a view partly in elevation and partly in section illustrating an alternate form of our invention for resilient retention; Fig. 9 is a plan view of the locknut shown in Fig. 8; Fig. 10 is a view similar to Fig. 8, but entirely in section and accompanied with a bolt fragmentarily shown as threaded into said lock-nut; Fig. 11 is a detail view partly in section and partly in elevation illustrating the upper member of the composite resilient annulus shown in Figs. 8, 9 and 10; Fig. 12 is a plan view in detail of the locking sleeve shown in Figs. 8, 9 and 10; Fig. 13 is a sectional view detailing the jacket and the lower member of the annulus illustrated in Figs. 8, 9 and 10, and further detailing the body of the nut and locking sleeve assembled with the resilient annulus, and still further diagraming a method for applying the assembled annulus, sleeve and body to the jacket; Fig. 14 is a view partly in section and partly in elevation of an alternate form of anchoring lock-nut for resilient retention in embodiment of our invention; Fig. 15 is a plan-sectional view of another alternate form of lock-nut of the resilient retention type constructed in accordance with our invention and adapted to be applied to bolts, as on instrument panels, and Fig. 16 is a view, partly in elevation and partly in section, in further illustration of the lock-nut shown in Fig. 15, the sectional portion of Fig. 16 being taken as on the line 16—16 of Fig. 15.

Reference being had to the accompanying drawings wherein similar parts are designated by similar reference characters throughout the several views, it will be seen that the form of lock-nut illustrated in Figs. 1 to 7, inclusive, includes a body 20 and a jacket 21 consisting of a tubular extension issuing from said body, the body being formed with a bore 22 co-axially disposed relative to said jacket and having a thread 23. Said body 20 is initially constructed together with said jacket 21 from metal or other suitably firm material, in blank form, as shown at the lower portion of Fig. 7. Further included in the form of lock-nut illustrated in Figs. 1 to 7, inclusive, are a resilient annulus 24 and a locking sleeve 25. The annulus 24 is constructed of rubber or other suitable resilient flowable material, while the locking sleeve 25 is made of metal or other relatively firm material. Said locking sleeve is formed with an external flange 26 at the bottom thereof and has an internal thread 27. A kerf cut in the sleeve 25 (Figs. 5 and 6) provides a slit 28 splitting said sleeve from end to end. Diametrically opposite said slit, the flange 26 is cut away, as at 29, to weaken said flange at that point and enable the split sleeve readily to expand and contact circumferentially. The locking sleeve 25 and resilient annulus 24 are initially assembled together, the annulus 24 being circumferentially stretched circumferentially about the sleeve 25, the sleeve 25 being circumferentially contracted by squeezing the same to close the slit 28 (Figs. 1, 2 and 7). This distortion of the sleeve 25 renders it oval-shaped transversely and, in respect to a bolt, as at 30, of the size suited to the nut, said sleeve is diametrically undersized in a plane at right angles to the diametrical plane intersecting the slit 28, and is diametrically oversized in said latter plane. Thus, constructed, the locking sleeve 25 is required to be circumferentially expanded to admit the bolt 30 thereto. To facilitate the admission of the bolt 30 to the locking sleeve 25, said sleeve is outwardly flared at its bottom or entrance-end.

The assembled annulus 24 and locking sleeve 25 (Fig. 7) are inserted, bottom ends foremost, into the jacket 21, in its blank form, in a manner wherein the previously circumferentially stretched annulus is circumferentially compressed. This is conveniently accomplished by applying a driving pressure against the top end of the annulus 24 as by means of a hollow plunger 31, while directing the assembled annulus 24 and sleeve 25 into the jacket 21, as through a conical tubular guide 32. In this operation, the outer portion of the annulus 24, at its bottom, is seated against the abutment 33 provided by the nut body 20 between the wall of the jacket 21 and the bore 22 in said body, and this seating of the annulus 24 against the abutment 33 is attended with the bottoming of the sleeve 25 against said abutment, the circumferential grip of the annulus 24 on said sleeve 25 contributing to this end along with the engagement of the sleeve-flange 26 with the inner portion of said annulus at the bottom thereof. As a final step in the assembly of nut parts, the free end portion of the jacket 21 is turned in to provide a flange 33. In forming this flange 34, it is forced against the outer portion of the annulus 24 at the top thereof adding axial compression of the material of the annulus to the circumferential compression thereof previously produced upon the introduction of the annulus into the jacket 25. It is to be noted that a "breathing gap" 35 is left between the inner edge of the flange 33 and the top of the locking sleeve 25 through which material of the annulus 24 may extrude under further compression of such material occasioned in the operation of the nut as will soon appear.

Upon assembling the locking sleeve 25 with the body 20 of the nut, the sleeve 25 is preferably angularly disposed relative to the threaded bore 22 so that the bottom end of the thread 27 in the sleeve 25 is out of endwise continuity with respect to the top end of the thread 23 of said bore 22, or, in other words, so that said threads 23, 27 will be in "out-of-phase" relationship.

A bolt, as at 30, screwed through the bore 22 and screwing into the sleeve 25 in the recess in the jacket 21, will exert an endwise force against the sleeve 25. This force of the bolt 30 acts both to push the sleeve 25 axially ahead and to expand said sleeve circumferentially. The axial movement of the sleeve 25 brings its thread into "in-phase" relationship with the thread 23 in the nut body 20 and with the thread on the bolt 30, while the circumferential expansion of the sleeve 25 threadedly admits the bolt thereinto upon the establishment of said "in-phase" relationship of said threads. Attending the axial shifting of the sleeve 25 is the added compression of the annulus 24 axially thereof between the flange 34 on the jacket 21 and the flange 26 on the sleeve 25. And attending the circumferential expansion of said sleeve is the further added compression of the annulus 24 radially thereof between said jacket 21 and sleeve 25. Thus compressed, axially and radially upon the application of the lock-nut to a bolt, the annulus 24 is distorted beyond the distortion thereof created originally in the assembly of the parts of the lock-nut. Distorted and under relatively great tension, the resilient annulus 24 acts against the jacket 21 and sleeve 25 radially thereof and against the flange 34 and abutment 33 of said jacket and the flange 26 of said sleeve axially of sleeve and jacket to resist rotation between them. Further, said distorted annulus 24 acts against the sleeve 25 radially thereof to grip the same about the bolt 30 and resist relative rotation of sleeve and bolt. Still further, the distorted annulus 24 acts against the sleeve 25 axially to bind faces of its thread against faces of the bolt thread and create additional resistance against rotation between locking sleeve 25 and bolt 30. And still further, said distorted annulus 24 acts against the sleeve 25 and through said bolt axially to bind faces of the bolt thread against faces of the thread 23 in the bore 22 of the nut body 20 and provide further added resistance against relative rotation of bolt and nut.

In the construction aforesaid, we have provided a lock-nut that is relatively simple and inexpensive, yet highly efficient. The relatively large number of thread convolutions provided for locking purposes in a lock-nut of limited length are to be noted. Also to be noted is the tolerance provided between the bolt and the slit 28 in the transversely out-of-round formation of the locking sleeve 25, which tolerance precludes the scoring of the bolt threads by the edges of the sleeve 25 along said slit 28.

Our invention contemplates a locking sleeve constructed with threads and without a slit therein. In such case, the axial displacement of the sleeve by the entering force of a bolt alone adds to the distortion of the annulus as effected originally in the assembly of parts. The invention also contemplates a locking sleeve, unslitted or slitted, formed of material in which the thread therein is cut by the thread of the bolt to which the lock-nut is applied.

In Figs. 8 to 13, inclusive, we have shown a form of lock-nut for resilient retention. This modification departs from the form shown in Figs. 1 to 7, inclusive, in the following respects. The nut body 20a is not integral with the jacket 21a, but is a separate part which, together with the locking sleeve 25a is encircled by the resilient annulus 24a. An opening 36 in the jacket 21a freely receives the end of a bolt 30a to be screwed into said nut body 20a. The separate nut body 20a has a bottom abutment 37 engaging an intermediate portion of the annulus 24a, in opposition to an abutment 38 on the jacket 25a upon which the bottom end of the annulus 24a is seated. The annulus 24a, for convenience of assembly, is divided transversely, said composite construction consisting of a member $24a^1$ encircling the nut body 20a and locking sleeve 25a and a second member 24a² against which the nut body 20a abuts. The method of making and the operation of the form of lock-nut shown in Figs. 8 to 13, inclusive are substantially the same as in the form of our invention shown in Figs. 1 to 7, inclusive, the principal distinction being featured in the employment of the annulus 24a in resiliently supporting the nut body 20a relative to the jacket 21a for damping vibrations. This feature is advantageous, among other things, in suspending hanger-bolts in installations attended with vibration. And, of course, the damping of vibrations, as by our improved construction, results in the imposition of lesser strains upon the nut which are to be withstood by the locking mechanism thereof.

Another form of our invention for resilient retention is shown in Fig. 14. It differs mainly from the construction shown in Figs. 10 to 13, inclusive, in the following respects: The body 20b of the lock-nut and the locking sleeve 25b are reversed to locate the former uppermost and the latter lowermost, and the jacket 21b is formed with a bottom flange 39 to fit in a bore 40 in a baseplate 41 and anchor the lock-nut thereto. This form of lock-nut shown in Fig. 14, is particularly useful, among other things, in resiliently supporting a leg-bolt 30b, and, as will be readily comprehended, it acts effectively to resist rotation of such leg-bolt relative to the lock-nut.

Another embodiment of our invention is shown in Figs. 15 and 16. It is a lock-nut for resilient retention and co-acts with a bolt after the fashion of the previously described forms shown in Figs. 8 to 14, inclusive. Its main distinctions are as follows. The locking-sleeve 25c is relatively thick and of strong material. This heavy sleeve functions in the manner of the previously described locking sleeves 25, 25a and 25b and, in addition, takes over the function of and supplants a separate nut-body. Being heavy and relatively unyielding, the locking sleeve 25c, instead of having a single slit therein, is formed with diametrically opposed slits 28c. And, instead of dividing the annulus 24c transversely, it is divided longitudinally to form the members 24c¹, 24c². The flange 26c engages a portion of the annulus 24c axially thereof in opposition to the top flange 34c on the jacket 21c and also engages a portion of said annulus, axially thereof, in opposition to the bottom abutment 39c on said jacket. This arrangement coupled with the radial engagement of the annulus 24c with sleeve 25c and jacket 21c yieldingly secures the sleeve axially thereof with respect to said jacket.

Changes in the specific form of our invention, as herein described, may be made within the scope of what is claimed without departing from the spirit of our invention.

Having described our invention, what we claim as new and desire to protect by Letters Patent is:

1. In a lock-nut, a body having a threaded bore therein, a jacket secured relative to the body and providing a recess into which said threaded bore opens and into which the leading end of a bolt screwing out of said bore may advance, a locking sleeve of relatively firm material formed with a slit therein splitting the same lengthwise thereof, a resilient annulus of flowable rubber-like material encircling the sleeve, said sleeve and annulus being disposed within said jacket, an abutment on the jacket, an abutment on the sleeve between said first abutment and the nut body, said abutments engaging axially opposite portions of the annulus, radially opposite portions of the annulus engaging said sleeve and jacket, said sleeve having an internal thread into which the thread of the leading end of the bolt may be screwed, said sleeve being normally yieldingly held by said annulus in a given position relative to the nut body, said sleeve, prior to the entry of the bolt into the same, being diametrically undersized relative to said bolt, said sleeve being diametrically expansible and axially movable from said given position in accommodation of the enforced entry of said bolt thereinto, said resilient annulus being flowably distorted upon such expansion and movement of the locking sleeve, the distorted annulus acting against said sleeve and jacket and their abutments to resist rotation between sleeve and jacket, and acting further upon said sleeve radially to grip the same about the bolt and axially bind faces of its thread against faces of the bolt thread and resist rotation between sleeve and bolt, and acting still further through said sleeve and bolt axially to blind faces of the bolt thread against faces of the thread in said nut body and resist rotation between said bolt and body.

2. In a lock-nut, a body having a threaded bore therein, a jacket secured relative to the body and providing a recess into which said threaded bore opens and into which the leading end of a bolt screwing out of said bore may advance, an axially split locking sleeve of relatively firm material and a resilient annulus of flowable rubber-like material, both disposed within said jacket, said annulus encircling the locking sleeve and being engaged at opposite portions thereof by said sleeve and jacket, said sleeve having internal threads adapted to receive threadedly said leading end of said bolt, said sleeve being internally undersized relative to said bolt and the thread thereof being out of phase relation with respect to the thread of said threaded bore prior to the entry of the bolt into the sleeve, said sleeve being circumferentially expansible and axially movable relative to said body in accommodation of the enforced entry of said bolt into the sleeve, said resilient annulus being flowably distorted upon such circumferential expansion and axial movement of said sleeve, the distorted annulus coacting with and resisting rotation between said locking-sleeve and jacket, said distorted annulus also acting upon said sleeve to bind the same against said bolt, and further acting through said sleeve and bolt to bind the bolt against the nut body.

3. In a lock-nut, a body having a threaded bore therein, a jacket secured relative to the body and providing a recess into which said threaded bore opens and into which the leading end of a bolt screwing out of said bore may advance, a locking sleeve of relatively firm material, a resilient annulus of flowable rubber-like material encircling said sleeve, said sleeve and annulus being disposed within said jacket, an abutment on the jacket, an abutment on the sleeve between said first abutment and the nut body, said abutments engaging axially opposite portions of the annulus, radially opposite portions of said annulus engaging said sleeve and jacket, said sleeve being normally yieldingly held by said annulus in a certain position relative to said nut body, said sleeve having an internal thread into which the leading end of the bolt may be screwed, said thread in said position of said sleeve being out of endwise continuity relative to the thread of said threaded bore to require movement of the sleeve by force of the bolt against it to enable the bolt threadedly to enter the sleeve, said resilient annulus being flowably distorted in accommodation of such movement of the sleeve, the distorted annulus acting against said sleeve and jacket and their abutments to resist rotation between sleeve and jacket, and acting further upon said sleeve axially to bind faces of its thread against faces of the bolt thread and resist rotation between sleeve and bolt, and acting still further through said sleeve and bolt axially to bind faces of the bolt thread against faces of the thread in the nut body and resist rotation between said bolt and body.

4. In a lock-nut, a body having a threaded bore therein, a jacket secured relative to the body and providing a recess into which said threaded bore opens and into which the leading end of a bolt screwing out of said bore may advance, a locking sleeve of relatively firm material formed with a slit therein splitting the same longitudinally thereof, a resilient annulus of flowable rubber-like material, both sleeve and annulus being disposed within said jacket, said annulus encircling the locking sleeve and being engaged at opposite portions thereof by said sleeve and jacket, said sleeve having internal threads adapted to receive threadedly said leading end of said bolt, said sleeve, prior to the entry of the bolt into the same and in respect to said bolt, being diametrically oversized in a plane intersecting said slit, while being diametrically undersized in a plane at right angles to said first plane, said sleeve being expansible in its diametrically undersized dimension in accommodation of the enforced entry of said bolt thereinto, said resilient annulus being flowably distorted upon such expansion of the locking sleeve, the distorted resilient annulus co-acting with and resisting rotation between said locking sleeve and jacket, said distorted resilient annulus also acting upon said sleeve to bind the same against said bolt and resist relative rotation between sleeve and bolt.

5. In a lock-nut, a body having a threaded bore therein, a jacket secured relative to the body and providing a recess into which said threaded bore opens and into which the leading end of a bolt screwing out of said threaded bore may advance, a locking sleeve of relatively firm material formed with a slit splitting the same lengthwise thereof, a resilient annulus of flowable rubber-like material encircling said sleeve, said sleeve and annulus being disposed within the recess in said jacket, said annulus radially engaging said jacket and sleeve and yieldingly holding the latter relative to the nut body and jacket, said sleeve having an internal thread into which the leading end of the bolt may be screwed, said sleeve, prior to the entry of the bolt into the same, being diametrically undersized relative to the bolt, said sleeve being expansible in accommodation of the threaded entry of said bolt thereinto, said resilient annulus being flowably distorted upon such expansion of the locking sleeve, the distorted annulus acting against said sleeve and jacket to resist rotation between the same and acting further upon the sleeve to grip the same about the bolt and resist rotation between sleeve and bolt.

6. In a lock-nut, a body having a threaded bore therein, a jacket secured relative to the body and providing a recess into which said threaded bore opens and into which the leading end of a bolt screwing out of said bore may advance, an axially split locking sleeve of relatively firm material and a resilient annulus of flowable rubber-like material disposed within said jacket, said annulus encircling the locking sleeve, said sleeve having an internal thread adapted to receive threadedly said leading end of said bolt, said sleeve being diametrically undersized relative to said bolt, prior to the entry of the bolt into the same, and being expansible in accommodation of the enforced entry of said bolt thereinto, said resilient annulus being flowably distorted upon such expansion of said sleeve by engagement of the same oppositely with said sleeve and jacket, the distorted annulus coacting with and resisting rotation between said locking sleeve and jacket, said distorted annulus also acting upon said sleeve to bind the same against said bolt and resist rotation between sleeve and bolt.

7. In a lock-nut, a body having a threaded bore therein, a jacket in the form of a tubular extension issuing from said body and providing a recess into which said threaded bore opens and into which the leading end of a bolt screwing out of said bore may advance, a locking sleeve of relatively firm material formed with a slit therein splitting the same lengthwise thereof, a resilient annulus of flowable rubber-like material encircling said sleeve, said sleeve and annulus being disposed endwise within said jacket, an abutment on the outer end of the jacket, an abutment on the inner end of the sleeve, said abutments engaging axially opposite portions of the annulus, radially opposite portions of the annulus engaging said sleeve and jacket, said nut body providing an abutment for the inner ends of said annulus and sleeve, said sleeve having an internal thread into which the leading end of the bolt may be screwed, said sleeve being normally yieldingly held by said annulus in a position with its inner end in engagement with the abutment provided by the nut body, the thread of the sleeve in such position thereof being out of endwise continuity relative to the thread of said threaded bore to require movement of the sleeve by force of the bolt against it to enable the bolt threadedly to enter the sleeve, said sleeve, prior to the entry of the bolt into the same, being diametrically oversized relative to the bolt in a plane intersecting said slit, while being diametrically undersized relative to said bolt in a plane at right angles to said first plane, said sleeve being expansible in the direction of its undersized dimension and axially movable from its said normal position in accommodation of the enforced entry of said bolt thereinto, said resilient annulus being flowably distorted upon such movement and expansion of the locking sleeve, the distorted annulus acting against said sleeve and jacket and against the abutments on the sleeve, jacket and nut body to resist rotation of the sleeve relative to the jacket and nut body, and acting further upon the sleeve radially to grip the same about the bolt and axially to bind faces of its thread against faces of the bolt thread, and acting still further through said sleeve and upon said bolt axially to bind faces of the bolt thread against faces of the thread in the nut body.

8. In a lock-nut, a tubular jacket having an opening at one end thereof for freely receiving a bolt and providing a recess into which the leading end of the bolt may advance, a nut body having a threaded bore therein, a locking sleeve of relatively firm material formed with a slit therein splitting the same endwise thereof, a resilient annulus of flowable rubber-like material, said nut body and sleeve being arranged end to end and both thereof encircled by said annulus, said annulus with its encircled nut body and sleeve being disposed endwise within said recess axially of said jacket, said jacket having end abutments engaged by end portions of said annulus, an abutment on the nut body engaging the annulus in axial opposition to one of the abutments on the jacket, an abutment on the sleeve engaging the annulus in axial opposition to the other of said abutments on said jacket, said annulus radially engaging said body, sleeve and jacket, said sleeve having an internal thread into which the leading end of the bolt may screw as it advances out of said nut body, said sleeve being normally yieldingly held by said annulus in position abutting the nut body, the thread of the sleeve in such position thereof being out of endwise continuity relative to the thread of said threaded bore to require movement of the sleeve relative to the nut body by force of the bolt against the sleeve to enable the bolt threadedly to enter the sleeve, said sleeve, prior to the entry of the bolt into the same, being diametrically undersized relative to said bolt, said sleeve being circumferentially expansible and axially movable from its said normal position in accommodation of the enforced entry of said bolt thereinto, said resilient annulus being compressed and thereby flowably distorted upon such movement and expansion of the locking sleeve, the distorted annulus acting against said sleeve, jacket and nut body to resist relative rotation thereof, and acting further upon the sleeve to grip the same about the bolt and axially bind faces of its thread against faces of the bolt thread and resist rotation between sleeve and bolt, and acting still further through said sleeve and upon said bolt axially to bind faces of the bolt against faces of the thread in the nut body and resist rotation between said bolt and nut body.

9. In a lock-nut, a tubular jacket having an opening at one end thereof for freely receiving a bolt and providing a recess into which the leading end of a bolt may advance, a nut body having a threaded bore therein, a locking sleeve of relatively firm material slitted endwise thereof, a resilient annulus of flowable rubber-like material, said body and sleeve being arranged end to end and both thereof encircled by said annulus, said annulus with its encircled sleeve and nut body being disposed endwise within said recess axially of said jacket and radially engaging said jacket, nut body and sleeve, an abutment at the end of the jacket adjacent said sleeve, an abutment at the other end of said jacket adjacent the nut body, said abutments being engaged by opposite end portions of the annulus, an abutment on the locking sleeve engaging the annulus in axial opposition to said first abutment, an abutment on the nut body engaging the annulus in axial opposition to said second abutment, said sleeve having an internal thread into which the leading end of the bolt may be enforcedly screwed as it advances out of the nut body, said sleeve being normally yieldingly held in a position relative to the nut body and, prior to the entry of the bolt thereinto, being diametrically undersized relative to said bolt, said sleeve being axially movable from its said normal position and circumferentially expansible in accommodation of the enforced entry of said bolt thereinto, said resilient annulus being compressedly flowably distorted upon such movement and expansion of the locking sleeve, the distorted annulus acting against said sleeve, jacket and nut body to resist relative rotation thereof, and acting further upon the sleeve to grip the same about the bolt and axially bind faces of its thread against faces of the bolt thread and resist rotation between sleeve and bolt, and acting still further through said sleeve and upon said bolt axially to bind faces of the bolt thread against faces of the thread in the nut body and resist rotation between said bolt and nut body.

10. In a lock-nut, a tubular jacket having an opening at one end thereof for freely receiving a bolt and providing a recess into which the leading end of the bolt may advance, a nut body having a threaded bore therein, a locking sleeve of relatively firm material, a resilient annulus of flowable rubber-like material, said nut body and sleeve being arranged end to end and both thereof encircled by said annulus, said annulus with its encircled nut body and sleeve being disposed endwise within said recess axially of said jacket, said jacket having end abutments engaged by end portions of said annulus, an abutment on the nut body engaging the annulus in axial opposition to one of the abutments on the jacket, an abutment on the sleeve engaging the annulus in axial opposition to the other of said abutments on the jacket, said annulus radially engaging said body, sleeve and jacket, said sleeve having an internal thread into which the leading end of the bolt may screw as it advances out of the nut body, said sleeve being normally yieldingly held by said annulus in position abutting the nut body, the thread of said sleeve in such position thereof being out of endwise continuity relative to the threads in the nut body to require movement of the sleeve relative to the nut body by force of the bolt against the sleeve to enable the bolt threadedly to enter the sleeve, said sleeve being movable from its said normal position in accommodation of the enforced entry of said bolt thereinto, said annulus being compressed and flowably distorted upon such movement of the locking sleeve, the distorted annulus acting against said jacket, sleeve and nut body to resist relative rotation thereof, and acting further upon the sleeve and upon the bolt through said sleeve axially to bind faces of the sleeve thread against faces of the bolt thread and faces of the bolt thread against faces of the thread in the nut body.

11. In a lock-nut, a tubular jacket having a bolt receiving opening at one end thereof and providing a recess into which the leading end of the bolt may advance, a locking sleeve of relatively firm material formed with a slit therein splitting the same longitudinally thereof, a resilient annulus of flowable rubber-like material encircling said sleeve, said sleeve and annulus being disposed within the recess in said jacket coaxially relative thereto, end abutments on said jacket engaging axially opposite portions of the annulus, said annulus radially engaging said jacket and sleeve, an abutment on the sleeve engaging the annulus axially thereof between abutments on said jacket, said sleeve having an internal thread into which the leading end of the bolt may be screwed, said sleeve, prior to the entry of the bolt into the same, being diametrically undersized relative to said bolt in a plane at right angles to the plane intersecting said slit diametrically of said sleeve, said sleeve being expansible in the direction of its said undersized dimension in accommodation of the threaded entry of said bolt thereinto, said resilient annulus being flowably distorted upon such expansion of the locking sleeve, the distorted annulus acting against said sleeve and jacket to resist rotation therebetween and acting further upon said sleeve radially to grip the same about the bolt and resist rotation between sleeve and bolt.

12. In a lock-nut, a tubular jacket having an opening at one end thereof for freely receiving a bolt and providing a recess into which the leading end of a bolt may advance, a nut body having a threaded bore therein, a locking sleeve of relatively firm material slitted endwise thereof, a resilient annulus of flowable rubber-like material, said body and sleeve being arranged end to end and both thereof encircled by said annulus, said annulus with its encircled sleeve and nut body being disposed endwise within said recess axially of said jacket, said annulus radially engaging said jacket, body and sleeve, said sleeve having an internal thread into which the leading end of the bolt may screw as it advances out of the nut body, said sleeve, prior to the entry of the bolt into the same, being diametrically undersized relative to said bolt, said sleeve being expansible in accommodation of the entry of said bolt thereinto, said resilient annulus being compressed and thereby flowably distorted upon such expansion of the locking sleeve, the distorted annulus acting against said sleeve, jacket and nut body to resist relative rotation thereof and acting further upon said sleeve to grip the same about the bolt and resist relative rotation of sleeve and bolt.

13. In a lock-nut, a tubular jacket having an opening at one end thereof for receiving a bolt and providing a recess into which the leading end of the bolt may advance, a locking sleeve of relatively firm material within said recess, formed with a slit therein extending lengthwise thereof, a resilient member of flowable rubber-like material also within said recess, said member being interposed between said sleeve and jacket in engagement with both of them radially thereof, said sleeve having an internal thread into which the leading end of the bolt may be screwed, said sleeve, prior to the entry of the bolt into the same, being diametrically undersized relative to the bolt, said sleeve being circumferentially expansible in accommodation of the threaded entry of said bolt thereinto, said resilient member being flowably distorted upon expansion of the locking sleeve, the distorted annulus acting upon said sleeve to grip the same about the bolt and resist rotation between sleeve and bolt.

14. In a lock-nut, a tubular jacket having an opening at one end thereof for receiving a bolt and providing a recess into which the leading end of the bolt may advance, a locking sleeve of relatively firm material within said recess, a resilient member of flowable rubber-like material also within said recess, said member being interposed between said sleeve and jacket in engagement with both of them radially thereof, said sleeve being adapted to receive threadedly said leading end of said bolt, said sleeve, prior to the entry of the bolt into the same, being diametrically undersized in one direction relative to the bolt, said sleeve being expansible in such direction in accommodation of the threaded entry of said bolt thereinto, said resilient member being flowably distorted upon such expansion of the locking sleeve, the distorted member acting upon said sleeve to grip the same upon the bolt and resist rotation between sleeve and bolt.

15. In a lock-nut, a tubular jacket having an opening at one end thereof for receiving a bolt and providing a recess into which the leading end of the bolt may advance, a locking sleeve of relatively firm material within said recess, formed with a slit therein extending lengthwise thereof, a resilient member of flowable rubber-like material also within said recess, said member being interposed between said sleeve and jacket in engagement with both of them radially thereof, said sleeve being adapted to receive threadedly said leading end of said bolt, said sleeve, prior to the entry of the bolt into the same, being diametrically undersized relative to the bolt, said sleeve being circumferentially expansible in accommodation of the threaded entry of said bolt thereinto, said resilient member being flowably distorted upon such expansion of the locking sleeve, the distorted member acting upon said sleeve to grip the same about the bolt and resist rotation between sleeve and bolt.

16. In a lock-nut, a body having a threaded bore therein, a jacket secured relative to the body and providing a recess into which said threaded bore opens and into which the leading end of a bolt screwing out of said bore may advance, a locking sleeve of relatively firm material and a resilient annulus of rubber-like material flowable under compression, both sleeve and annulus being disposed within said jacket, said annulus being initially stretched about the locking sleeve peripherally thereof and also compressed between the sleeve and said jacket flowably to distort the same, said sleeve being adapted to receive threadedly said leading end of the bolt upon the enforced screwing of said bolt thereinto, said resilient annulus being further flowably distorted under additional compression set up by said sleeve upon its threaded reception of said bolt, the distorted annulus coacting with and resisting relative rotation between said locking sleeve and jacket, and also acting upon said sleeve to resist relative rotation between the same and said bolt.

17. In a lock-nut, a body having a threaded bore therein, a jacket secured relative to the body and providing a recess into which said threaded bore opens and into which the leading end of a bolt screwing out of said bore may advance, said jacket having an annular flange thereon, a locking sleeve of relatively firm material having an annular flange thereon, and a resilient annulus of rubber-like material flowable under compression, both sleeve and annulus being disposed within said jacket, said annulus encircling the locking sleeve peripherally thereof between said flanges, the annulus being initially flowably distorted by compression thereof radially between sleeve and jacket proper and axially between said flanges on sleeve and jacket, said sleeve being adapted to receive threadedly said leading end of said bolt upon the enforced screwing of the bolt thereinto, said resilient annulus being further flowably distorted under additional compression set up by said sleeve upon its threaded reception of said bolt, the distorted annulus coacting with and resisting relative rotation between said locking sleeve and jacket and also acting upon said sleeve to resist relative rotation between sleeve and bolt.

DANA C. ECKENBECK.
CHARLES L. MADDEN.
PHILIP E. SLAUGHTER.